J. G. OEHLER.
AUTO WHEEL.
APPLICATION FILED JULY 17, 1915.
1,231,780.
Patented July 3, 1917.
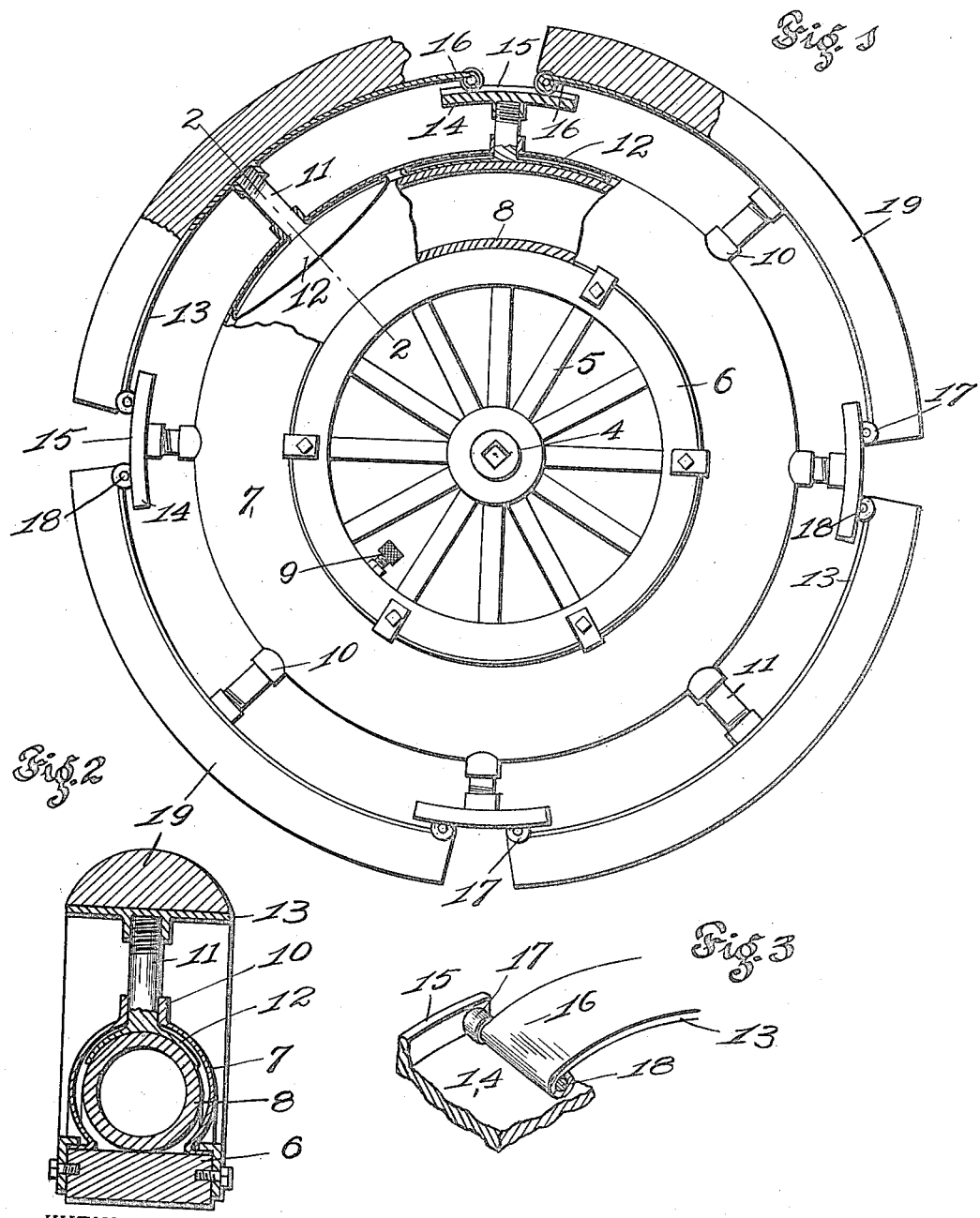
WITNESSES:
W. C. Stein
P. M. Austine
INVENTOR.
John G. Oehler
BY
Alfred R. Eusco Atty.
ATTORNEY.

UNITED STATES PATENT OFFICE.

JOHN G. OEHLER, OF ST. LOUIS, MISSOURI.

AUTO-WHEEL.

1,231,780.        Specification of Letters Patent.        Patented July 3, 1917.

Application filed July 17, 1915. Serial No. 40,533.

*To all whom it may concern:*

Be it known that I, JOHN G. OEHLER, a citizen of the United States, and resident of St. Louis, Missouri, have invented certain new and useful Improvements in Auto-Wheels, of which the following is a specification.

This invention relates to improvements in a vehicle wheel of an auto type, and has for its object a wheel consisting of a pneumatic tube located between the hub and the rim and supported in a rigid casing; and a plurality of shoes contacting with the periphery of the pneumatic tube and on which shoes the pressure against the outer tire is imparted so as to provide sufficient resiliency and prevent puncturing of the inflated or pneumatic tube.

A further object of my invention is to construct a wheel of the pneumatic type to be used on vehicles such as automobiles and the like, to avoid puncturing, and in order to obtain suitable resiliency the outer tire is constructed with supporting trunnions provided with shoes, which shoes contact with the periphery of the pneumatic tube which said tube is protected from outer contact by rigid housing.

Figure 1, is a side elevation of my improved wheel with a part thereof broken away and in section showing the construction of my invention.

Fig. 2, is a cross-sectional view of my invention taken on the line 2—2 of Fig. 1.

Fig. 3, is a detail sectional perspective view of a portion of the rim and supporting plate showing the roller mechanism which forms a part of my invention.

Referring to the drawings in detail, 4 indicates a hub, 5 the spokes secured thereto and 6 a rim; and to said rim is firmly and rigidly attached a rigid tubular casing 7 constructed preferably of material such as steel or the like. In this casing is located a pneumatic tube 8, the same being properly inflated through the inlet 9; the casing 7 is provided at intervals with tubular inlets or guide walls 10, through which are passed and guided trunnions 11. One end of the trunnions is rigidly attached to a shoe 12, which is shaped to conform with the outer contour of the pneumatic tube 8, the opposite end of the trunnion supporting the outer rim or tire of the wheel.

A series of the trunnions 11, are supporters to sections 13, comprising the wheel tire, and a series of the trunnions are attached to plates 14, the sides of which are provided with flanges 15, acting as supports and guides for the ends of the sections constituting said tire.

The ends 16 of the sections which constitute the outer rim are provided with small rollers 17, which are supported on the axle 18, firmly held to the end of the sections, a roller being located on each side of the sections and held in contact with the outer surface of the plates 14, so that when pressure is put on the wheel the sections constituting the tire will be permitted to properly expand by means of the rollers moving on the outer surface of the plates while the pressure on the trunnions 11 brings the shoe in contact against the inflated or pneumatic tube.

The essential feature of my invention is to construct a wheel to provide a sufficient amount of resiliency as in ordinary pneumatic tires without bringing the tire in direct contact with the surface, but to have a solid tire 19, such as rubber or the like, fastened to the sections of the rim, which tire contacts with the ground, and the pressure is exerted through the agency of the trunnions 11, on the shoes against the inflated or pneumatic tube incased in the rigid housing; thus preventing in any way the possibility of puncturing the pneumatic section of the wheel.

Having fully described my invention what I claim is:

A wheel of the class described comprising a sectional rim composed of four parts each part provided with a solid rubber tire, each end of the sectional rim provided with a pair of rollers, a trunnion rigidly attached at approximately the center of each section of the rim, a trunnion located midway between each pair of the first named trunnions, each of the last named trunnions provided with a flanged plate for supporting the rollers of the sectional rim, a wheel having a casing mounted around the same, a pneumatic tube located in the casing, shoes located within the casing and contacting with the pneumatic tube and firmly attached to the inner ends of the trunnions, substantially as specified.

In testimony whereof, I have signed my name to this specification, in presence of two subscribing witnesses.

JOHN G. OEHLER.

Witnesses:
ALFRED A. EICKS,
WALTER C. STEIN.

Copies of this patent may be obtained for five cents each, by addressing the "Commissioner of Patents, Washington, D. C."